(12) United States Patent
Jung

(10) Patent No.: US 6,898,635 B2
(45) Date of Patent: May 24, 2005

(54) MOBILE COMMUNICATION SYSTEM AND METHOD OF SELECTING SERVER IN MOBILE COMMUNICATION SYSTEM

(75) Inventor: Ji A Jung, Kyounggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/327,041

(22) Filed: Dec. 24, 2002

(65) Prior Publication Data

US 2003/0123424 A1 Jul. 3, 2003

(30) Foreign Application Priority Data

Dec. 29, 2001 (KR) .......................................... 2001-88566

(51) Int. Cl.⁷ .......................... G06F 15/173; G06F 9/46
(52) U.S. Cl. ...................................... 709/226; 718/105
(58) Field of Search ................................. 709/226, 219, 709/203, 218, 223, 105, 238; 718/105; 370/395.21, 230

(56) References Cited

U.S. PATENT DOCUMENTS

| | | | |
|---|---|---|---|
| 5,940,738 A * | 8/1999 | Rao ........................... | 725/103 |
| 6,286,052 B1 * | 9/2001 | McCloghrie et al. ....... | 709/238 |
| 6,304,549 B1 * | 10/2001 | Srinivasan et al. .......... | 370/230 |
| 6,463,454 B1 * | 10/2002 | Lumelsky et al. .......... | 709/105 |
| 6,463,470 B1 * | 10/2002 | Mohaban et al. ........... | 709/223 |
| 6,516,350 B1 * | 2/2003 | Lumelsky et al. .......... | 709/226 |
| 6,529,950 B1 * | 3/2003 | Lumelsky et al. .......... | 709/218 |
| 6,578,068 B1 * | 6/2003 | Bowman-Amuah ......... | 709/203 |
| 6,625,156 B2 * | 9/2003 | Shaio et al. ............ | 370/395.21 |

* cited by examiner

*Primary Examiner*—William A. Cuchlinski, Jr.
*Assistant Examiner*—Michael Delgado
(74) *Attorney, Agent, or Firm*—Fleshner & Kim, LLP (57) ABSTRACT

A method of selecting a server in a mobile communication system includes registering kinds of resources quantitatively measurable of each server, receiving changed amounts of the kinds of sources at predetermined intervals from each of the servers, receiving a service request with a QoS (quality of service) level from a service user, mapping the QoS level into amounts of the kinds of resources, and selecting at least one server among the servers for the service request based on the changed amounts and the amounts mapped from the QoS level.

24 Claims, 6 Drawing Sheets

MOBILE COMMUNICATION SYSTEM AND METHOD OF SELECTING SERVER IN MOBILE COMMUNICATION SYSTEM

BACKGROUND OF THE INVENTION

1. Field of the Invention

The present invention generally relates to mobile communication systems, and more particularly to a method of selecting a server in a mobile communication system.

2. Background of the Related Art

In a conventional multistage communication system that provides QoS (quality of service) levels to a plurality of subscribers, a server is selected without considering a resource condition of the server. This selection may be made in one of several ways.

Figure 1:
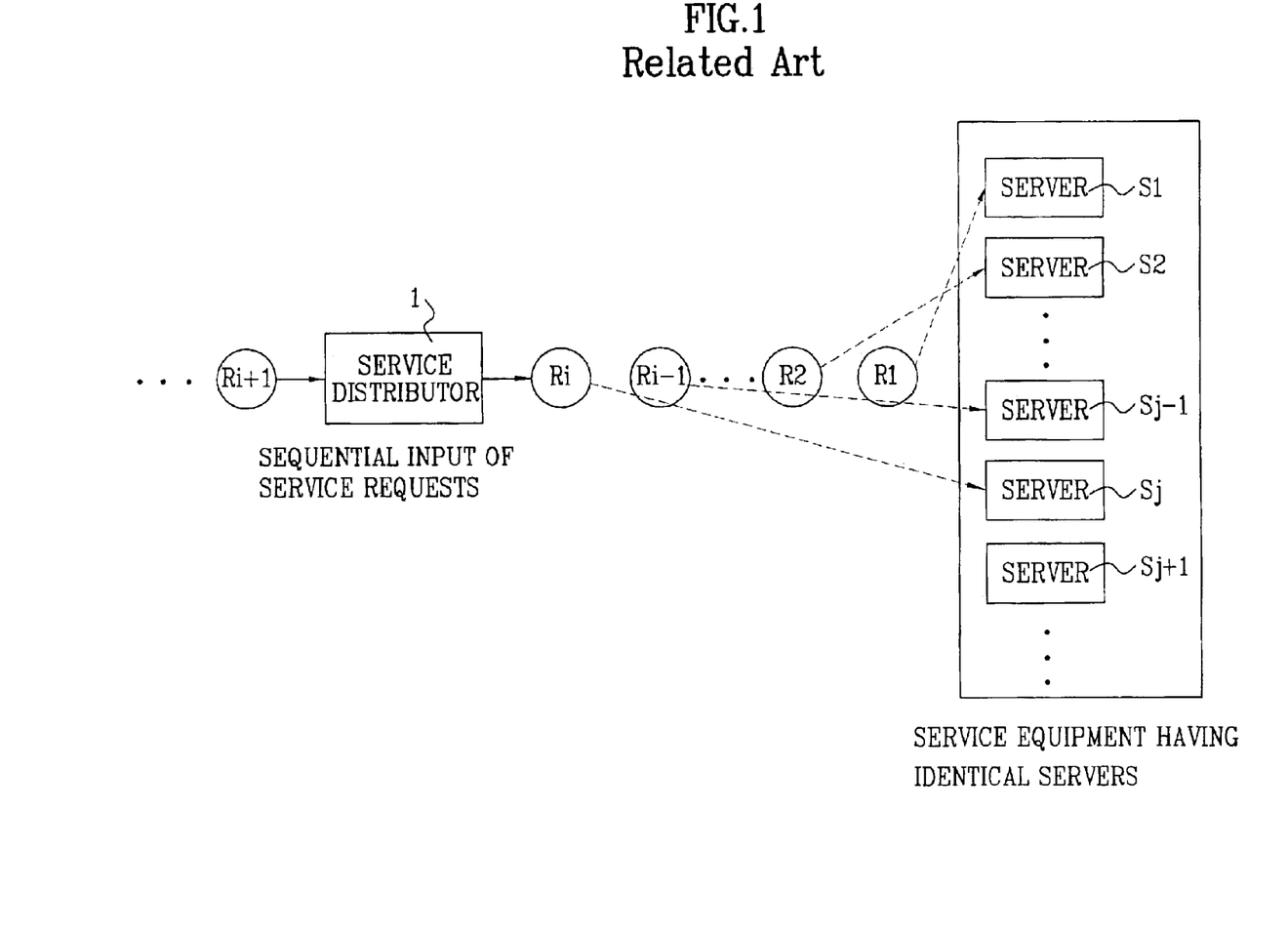
FIG. 1 is a diagram illustrating an example of the conventional server selection construction in a mobile communication system.

FIG. 1 shows a system which performs server selection based on a round-robin method. In this system, selecting a server Sj is performed or follows when a new service request Ri is provided to a service distributor. If the i-th service request is provided to the service distributor, the distributor first checks which server is selected as (j−1)-th server in order to provide a corresponding service for the (i−1)-th service. If the number of candidate servers is j−1, the first server is selected for the i-th service request. If the number is not j−1, the j-th server is selected for the i-th service request.

Figure 2:
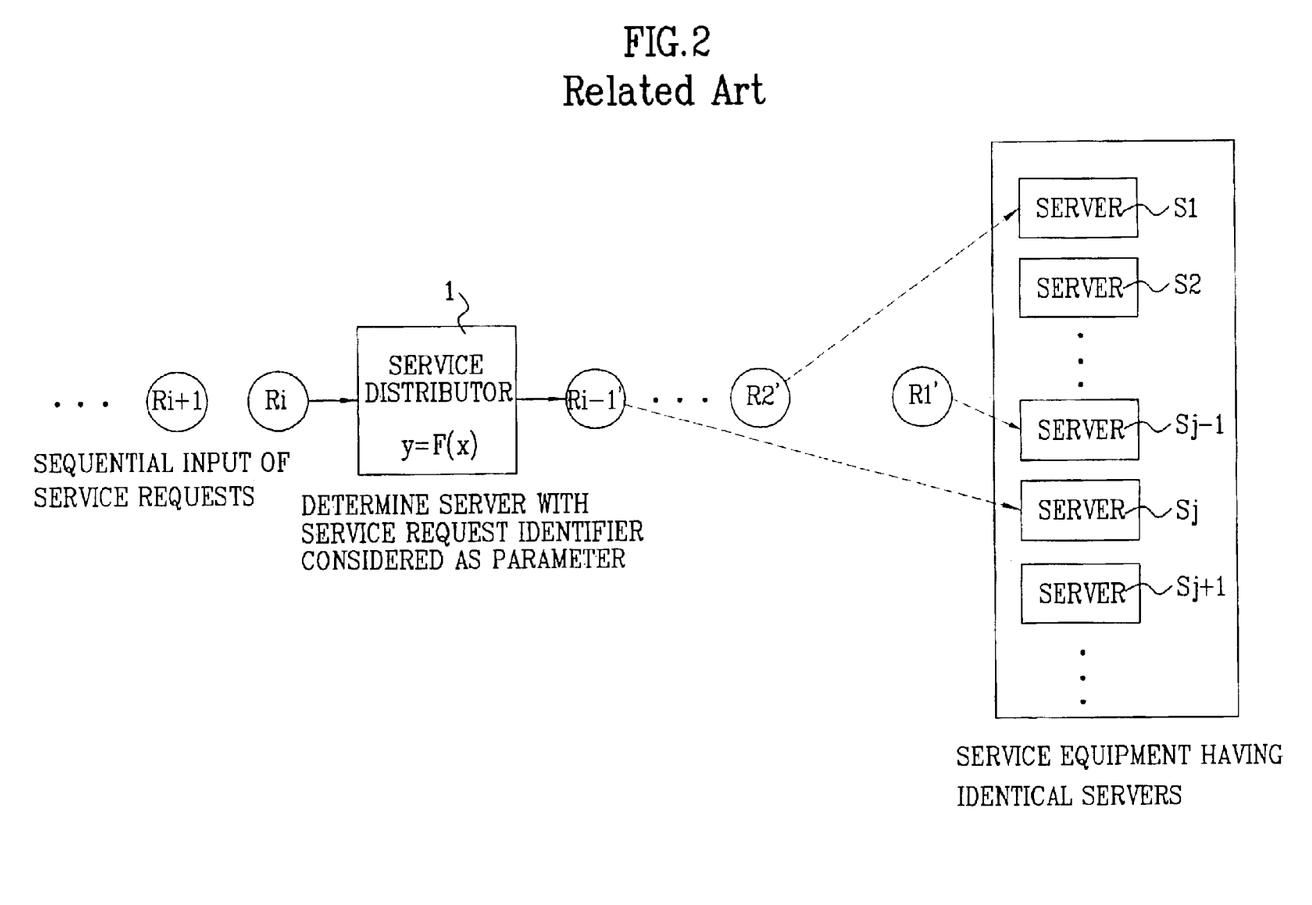
FIG. 2 is a diagram illustrating another example of the conventional server selection construction in a mobile communication system.

FIG. 2 shows a system which performs server selection based on an identifier which is simultaneously provided to a multistage communications system, when a new service is requested and without considering a resource condition of the candidate servers. In the second system, selecting a server Sj is based on an identifier simultaneously provided to a service distributor with the service request Ri. The identifier provided with the service request is called the service request identifier. If the i-th service request is provided to the service distributor, the identifier of the server to be allocated for the service request is determined using a function having the service request identifier as one of its parameters. Then, the j-th server of the determined identifier is selected for the i-th service request.

Figure 3:
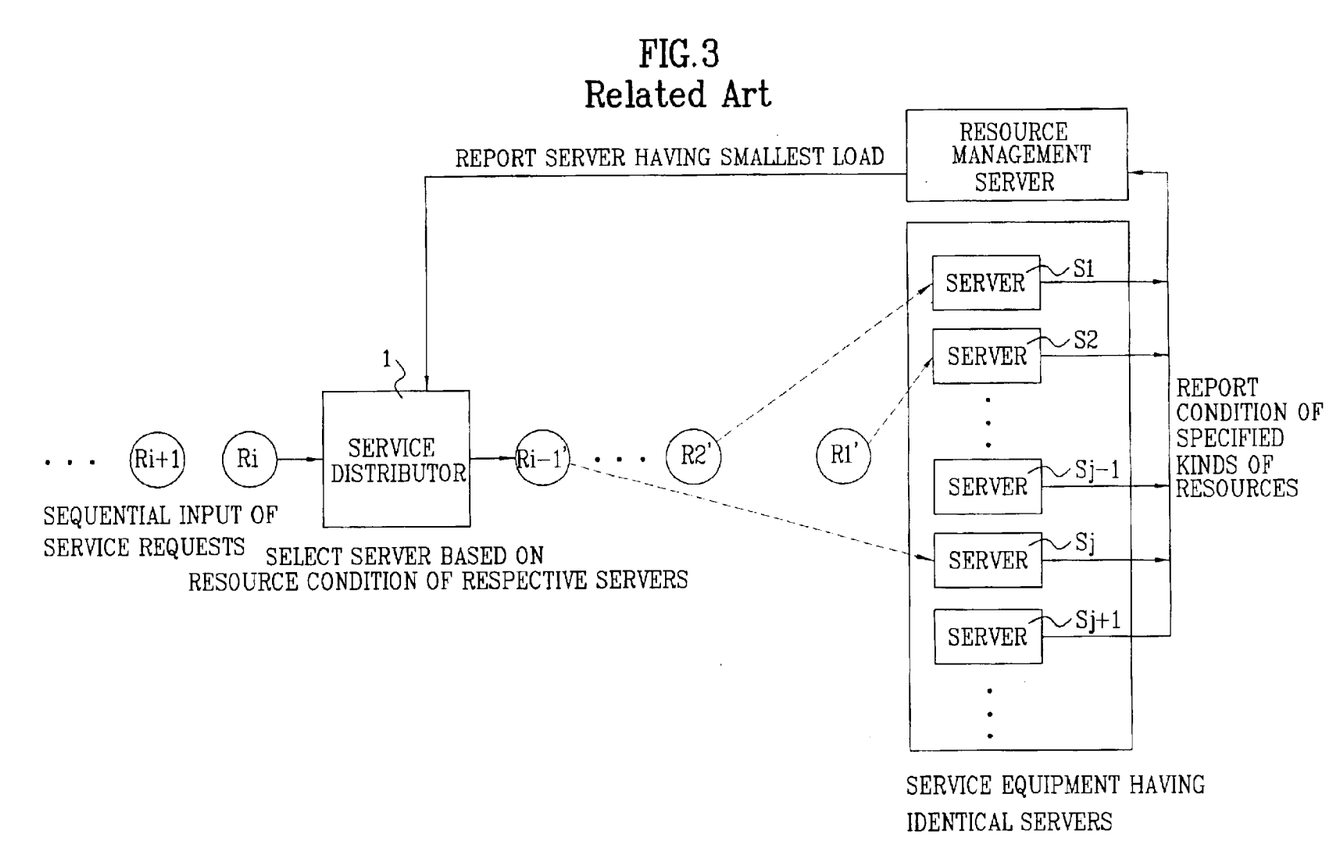
FIG. 3 is a diagram illustrating still another example of the conventional server selection construction in a mobile communication system.

FIG. 3 shows a server-selection system where a load distribution is performed by focusing only on a specified resource and where selecting the server provides a corresponding service in consideration of the resource condition of the server. In this system, when a new service request Ri is provided to a service distributor, the procedure of selecting a server Sj to provide a corresponding service for the (i−1)-th service is as follows. The service distributor performs the selection so that candidate servers distribute the load for an arbitrary server resource. First, a resource management server periodically receives a report message of the resource conditions of all servers from the servers, and informs a service distributor of the identifier of the server having the smallest load. If the i-th service request is provided to the service distributor, the service distributor checks which server identifier is most recent among the server identifiers received by the service distributor from the resource management server. If the server identifier that the service distributor most recently received from the resource management server is j, the service distributor allocates the j-th server for the i-th service request. Although the service distributor is depicted with the same reference numeral in each of FIGS. 1–3, the service distributors in each system is unique to its respective system and may not constitute the same elements or functions.

The conventional method of selecting a server to provide service without considering resource conditions of servers has the following disadvantages.

First, from the viewpoint of the system, since the necessary amount of resources varies according to the QoS (quality of service) level of each service, the load may be concentrated on a specified server. Thus, the performance of the server may deteriorate thereby resulting in lowering the system efficiency.

Second, from the viewpoint of a subscriber, if a server which cannot provide a corresponding service is selected for a service request due to the concentration of the load, it is impossible to provide a stable service to the subscriber.

The conventional method of selecting a server to provide a corresponding service by distributing the load in consideration of a specified server has the following disadvantages.

First, from the viewpoint of the system, since the load is distributed in consideration of only one resource, only the one resource is expended even through other resources of a specified server may be available, particularly if diverse QoS levels are provided. Therefore, the possibility that service cannot be provided is greater. This results in degradation of system efficiency.

Second, from the viewpoint of a subscriber, a server may not be able to provide service in response to a service request due to concentration of the load. In this case, a stable service may not be provided to the subscriber.

SUMMARY OF THE INVENTION

An object of the present invention is to provide a system and a method of selecting a server in a mobile communication system which substantially obviates one or more problems of conventional systems and methods of this type.

Another object of the present invention is to provide a system and a method which selects a server in a mobile communication system even when a specified resource of the server is exhausted.

Another object of the present invention is to provide a system and a method of selecting a server in a mobile communication system that selects one server to provide service among many serviceable servers by distributing the load when a new service request is produced.

Another object of the present invention is to provide a system and a method of selecting a server in a mobile communication system that distributes the load among servers which measure the amount of available resources for providing QoS of diverse levels.

To achieve these and other objects and advantages, a mobile communication system in accordance with the present invention includes n (n is a positive integer that is two or more) servers having m (m is a positive integer that is two or more) kinds of resources, a resource management server receiving changed amounts of the kinds of resources from each server at predetermined intervals, and a service distributor receiving a service request with a QoS (quality of service) level from a service user, mapping the QoS level into amounts of the kinds of resources (quantification of a resource parameter), and selecting a server having the lowest load among the n servers for the service request based on the changed amounts and the amounts mapped from the QoS level.

Preferably, in a packet control function (PCF) of the mobile communication system, the kinds of resources used for selecting at least one packet interface processor at a packet control processor (PCP) are at least one of the number of available asynchronous transfer mode (ATM) connections at OS level, the number of available ATM connections at logical level, the number of ATM connections required per call, a processing capacity of an interface between a radio network and a packet data serving node (PDSN), a load of a central processing unit (CPU), and a memory capacity.

Preferably, the kinds of resources used for selecting at least one PDSN at the PCF of the mobile communication system are at least one of network resources between the PCF and the PDSN, the number of PDSN logical identifications, the number of available ports, and the number of available IPs (internet protocols).

Preferably, the kinds of resources used for selecting at least one PCF/PCP at a base station controller (BSC)/call control processor (CCP) of the mobile communication system are at least one of ATM resources between the BSC and the PCF, an available processing rate of the PCF, and a memory capacity. Preferably, the kinds of resources are quantitatively measurable (obtaining quantification of the resource parameter), the servers have a same function, and the load is determined as a ratio of a necessary amount to a useable amount of each kind of resources in each server. Also, the necessary amount of each kind of resources may be the resource amount mapped from the QoS level, and the useable amount of each kind of resources may be the changed amount of available resources reported by each server.

Preferably, the service distributor also determines a server having a minimum value of the maximum ratio of a necessary amount to a useable amount of each kind of resources, based on the assumption that the each server is selected for the service request.

In another aspect of the present invention, a method of selecting a server in a mobile communication system including n (n is a positive integer that is two or more) servers having m (m is a positive integer that is two or more) kinds of resources, a service distributor selecting at least one server for a service request, and a resource management server transferring changed amounts of kinds of available resources received from each server at predetermined intervals to the service distributor, comprises the steps of if an i-th service request Ri including a QoS (quality of service) parameter is received by the service distributor, mapping the QoS level onto amounts of the kinds of resources {N_Rsc1, N_Rsc2, N_Rsc3, ..., N_Rscm}_at the service distributor for i, j=0, 1, ..., respectively, determining a kind of the resource BtnRsc_j having the highest ratio of the necessary amount (N_Rscm) of resources to a useable amount_ (Rscm_j) of resources in each server and a maximum generation rate of bottleneck of the determined kind of resources with respect to the service request Ri at the service distributor, determining a server Sj having a minimum value of the maximum generation rate of bottleneck on the assumption that the each of the servers {S1, S2, S3, ..., Sn}_is selected for the i-th service request, and allocating the determined server Sj for the i-th service request Ri.

Preferably, a maximum generation rate of bottleneck BtnRate_j and the kind of resource BtnRsc_j when the j-the server is allocated for the i-th service request Ri are determined using the following equation: Btn1(Ri,Sj)=Max (N_Rsc1/Rsc1_j,N_Rsc2/Rsc2_j,N_Rsc3/Rsc_j, ..., N_Rscm/Rscm_j). Also, the server Sj that has a minimum value of the generation rate of bottleneck maybe determined using the following equation: Btn2(Ri)=Min {Btn1(Ri,S1), Btn1(Ri,S2), Btn1 (Ri,S3), ..., Btn1 (Ri,Sn)}.

The method may further; include the steps of, after initialization of each of the servers, determining the kinds of resources {Rsc1,Rsc2,Rsc3, ..., Rscm} quantitatively measurable in the each server S, registering the kinds of resources in the service distributor at the resource management server, and transferring, to the service distributor, the changed amounts of the kinds of available resources {Rsc_j, Rsc2_j, Rsc3_j, ..., Rscm_j} periodically obtained from the each server Sj (where j is a positive integer that is in the range of 0 to n) with respect to all kinds of resources registered in the service distributor at the resource management server. Preferably, the kinds of resources are quantitatively measurable, and the servers have a same function.

In still another aspect of the present invention, a method of selecting a server in a mobile communication system including a plurality of servers and a service distributor for selecting at least one of the servers, comprises the steps of registering kinds of resources quantitatively measurable of each server, receiving changed amounts of the kinds of resources at predetermined intervals from each of the servers, receiving a service request with a QoS (quality of service) level from a service user, mapping the QoS level into amounts of the kinds of resources, and selecting at least one server among the servers for the service request based on the changed amounts and the amounts mapped from the QoS level. Preferably, when the ratio of the amount mapped from the QoS level to the changed amount for a kind of resources is highest, a server having a minimum value of the maximum ratio is based on the assumption that each server is selected for the service request is selected. Also, the servers may have a same function.

DETAILED DESCRIPTION OF PREFERRED EMBODIMENTS

Figure 4:
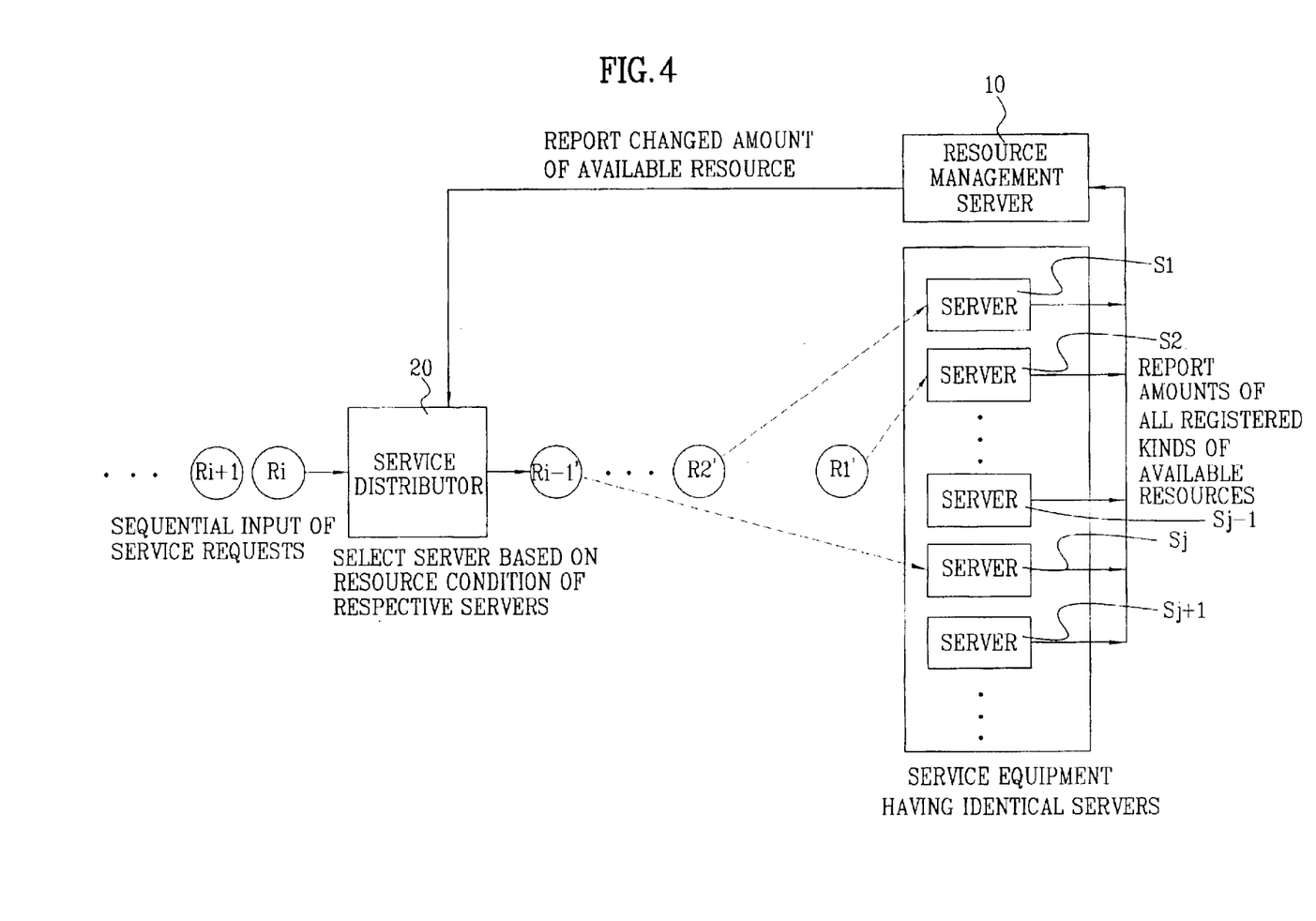
FIG. 4 is a diagram illustrating the server selection construction in a mobile communication system according to the present invention.

FIG. 4 is a diagram illustrating a partial construction of a multistage communication system according to the present invention. This system includes n (n is a positive integer that is two or more) selectable servers for providing the same function in a specified stage of the communication system. In the specified stage of the communication system, the number of the kinds of finite resources quantitatively measurable in the respective servers is m (m is a positive integer that is two or more).

In the system of FIG. 4, a QoS level required by a service user or a server of a lower stage may be mapped, at each stage, onto an amount of resources required by the server of an upper stage. At each stage of the system, a service distributor 20 selects a server to provide a corresponding service for a new service request. The service distributor 20 receives a service request with at least one of diverse QoS (quality of service) levels from the service user, maps the QoS level into the amount of resources, and selects the server having a low load inversely proportional to the amount of the QoS level among the n servers. The service distributor 20 also receives changed amounts of available resources of the respective servers Sj from a resource management server 10. The resource management server 10 receives information on the changed amounts of available resources from the servers at predetermined intervals, and transfers the changed amounts of available resources to the service distributor 20.

Figure 5:
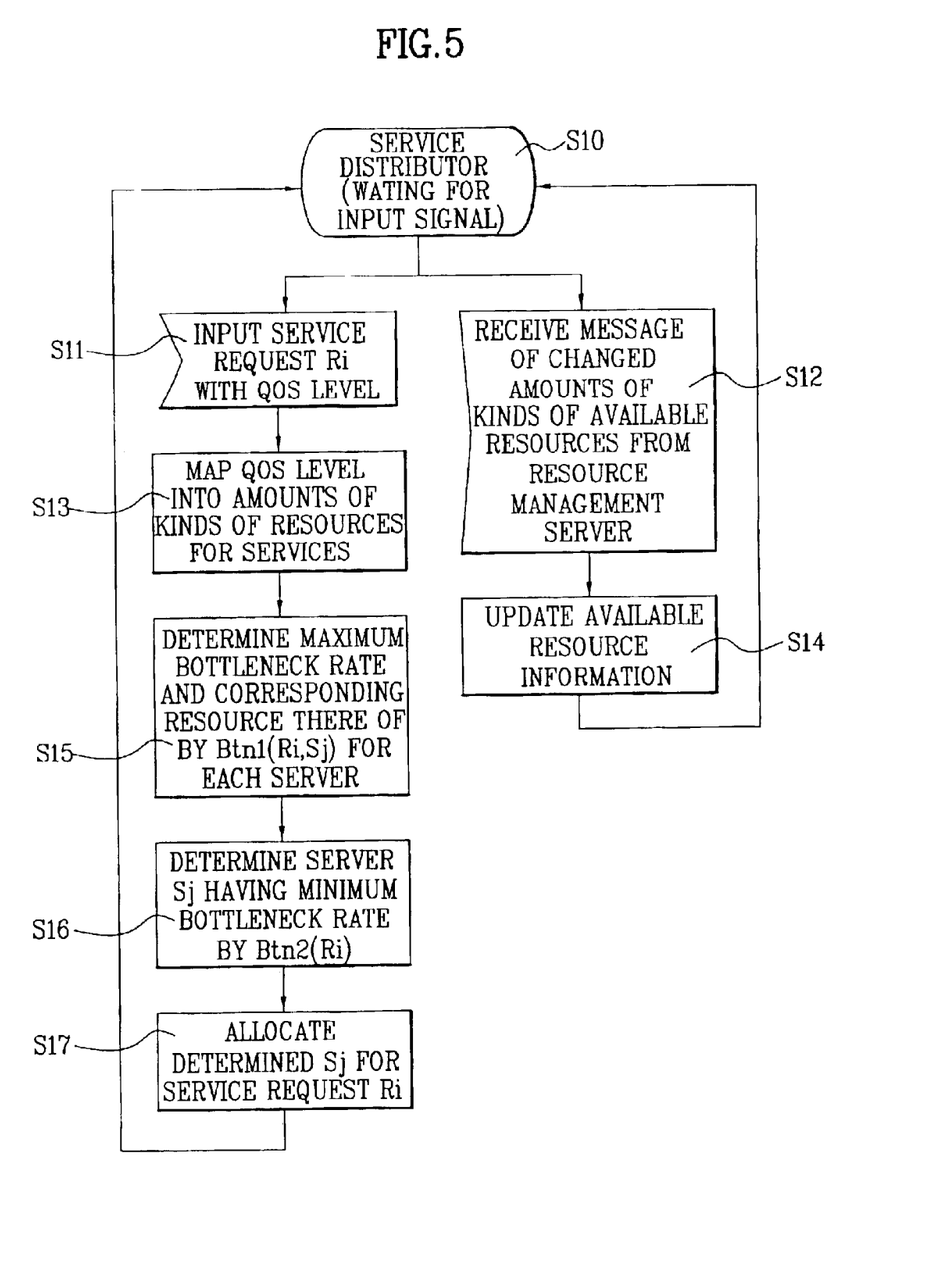
FIG. 5 is a flowchart illustrating the operational process of a service distributor in FIG. 4.

FIG. 5 shows steps included in a method performed by the service distributor 20 for selecting a server Sj to provide corresponding service. This method distributes the load of each of a plurality of kinds of resources of the server Sj when a new service request Ri is provided to the service distributor 20 at the specified stage of FIG. 4.

Initially, the service distributor waits for input signal (S10). If the i-th service request Ri including a QoS (quality of service) parameter is provided to the service distributor 20 (S11), the service distributor 20 performs a mapping of the QoS parameter onto amounts of kinds of resources $\{N\_Rsc1, N\_Rsc2, N\_Rsc3, \ldots, N\_Rscm\}$. The amounts may be required by the server S of the corresponding stage (S13). The service distributor 20 then determines the resource that has a highest ratio of the necessary amount of resources (N_Rscm) to a useable amount of resources (Rscm_j) in each server Sj. A generation rate of bottleneck (hereinafter, bottleneck rate) due to the determined resource on the assumption that each of the servers $\{S1, S2, S3, \ldots, Sn\}$ is then selected for the service request Ri (S15). The highest ratio means that a bottleneck is raised in the multi-stage communication system. Also, the usable amount of resources (Rscm_j) of each server Sj may be reported from the corresponding server at predetermined intervals. The maximum generation rate of bottleneck BtnRate_j and the kind of resource BtnRsc_j having the maximum generation rate of bottleneck, when j-th server is selected for the i-th service request Ri, may be found, for example, using Equation (1) as follows:

$$Btn1(Ri, Sj) = Max(N\_Rsc1/Rsc1\_j, N\_Rsc2/Rsc2\_j, N\_Rsc3/Rsc3\_j, \ldots N\_Rscm/Rscm\_j)$$

The server Sj that has the lowest generation rate of bottleneck is based on the assumption that each of the servers $\{S1, S2, S3, \ldots, Sn\}$ is selected for the i-th service request Ri. At this time, the server Sj may be determined using Equation 2 (S16) as follows:

$$Btn2(Ri) = Min\ \{Btn1(Ri, S1), Btn1(Ri, S2), Btn1(Ri, S3), \ldots, Btn1(Ri, Sn)\}$$

The determined server Sj is allocated for i-th service request Ri through the functions Btn1(Ri,Sj) and Btn2(Ri) (S17).

Meanwhile, if the service distributor 20 receives a message for reporting the changed amounts of kinds of resources from the resource management server 10 (S12), it updates information on the amounts of the kinds of available resources, and returns to an initial stage for waiting for the input signal (S14).

Figure 6:
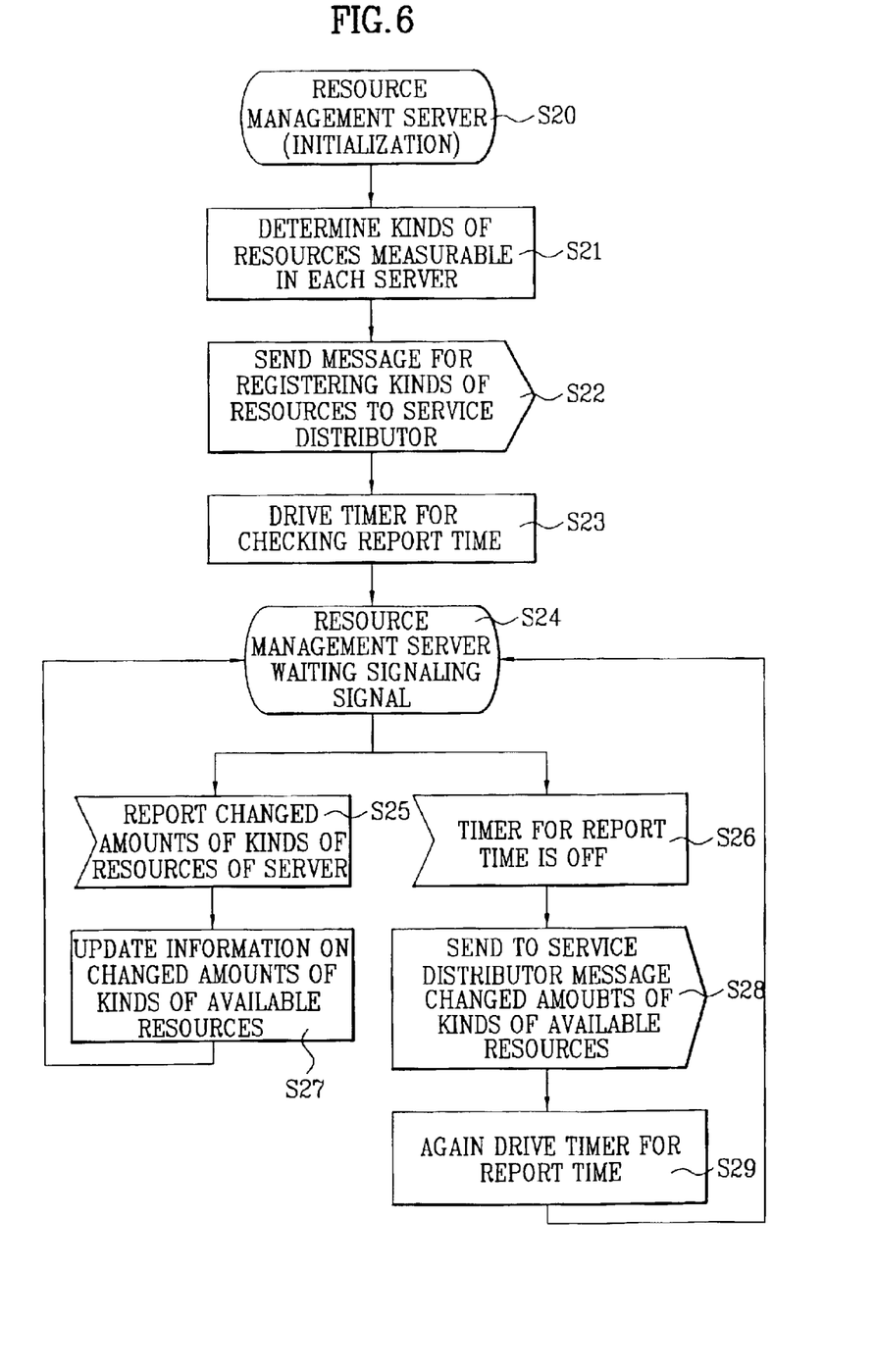
FIG. 6 is a flowchart illustrating the operational process of a resource management server in FIG. 4.

Next, the process of the resource management server 10 for supporting the procedure of the service distributor 20 will be explained with reference to FIG. 6, which shows the operational process of the resource management server 10.

First, in a state where the resource management server 10 is initialized (S20), the resource management server 10 determines the kinds of resources $\{Rsc1, Rsc2, Rsc3, \ldots, Rscm\}$ quantitatively measurable in each server S (S21), and sends a message for registering the kinds of resources which are quantitatively measurable to the service distributor 20 (S22). Thereafter, the service distributor 20 registers the kinds of resources of the report message.

Then, the resource management server 10 periodically receives a report message of the changed amounts of a plurality of kinds of available resources $\{Rsc\_j, Rsc2\_j, Rsc3\_j, \ldots, Rscm\_j\}$ from each server Sj (where, j is a positive integer that is in the range of 0 to n) with respect to all the kinds of resources registered in the service distributor 20, and transfers information indicative of the changed amounts of the kinds of available resources to the service distributor 20.

The resource management server 10 drives a timer for checking the report time after sending, to the service distributor 20, the report message of the changed amounts of the kinds of resources registered in the service distributor 20 (S23). If the resource management server 10 receives, from each server, another report message of the changed amounts of the kinds of resources registered in the service distributor 20 during prescribed time of the timer (S25), it updates information on the changed amounts of kinds of available resources (S27).

Then, if the timer is out of time for waiting for a signaling signal from a upper layer (S24 and S26), the resource management server 10 again transmits, to the service distributor 20, another report message indicating the changed amounts of the kinds of available resources registered (S28). Server 10 then drives again the timer for checking the report time (S29). That is, the resource management server 10 transmits a report message of the changed amounts of all the kinds of available resources of each server at predetermined intervals.

The kinds of resources that may be used in the preferred embodiment will now be explained. In a packet control function (PCF) of the mobile communication system, the resources used for selecting at least one packet interface processor of a packet control processor may be the number of available ATM (asynchronous transfer mode) connections at OS-level, the number of available ATM connections at a logical level, the number of ATM connections required per call, a processing capacity of an R-P interface (i.e., interface between a radio network and a PDSN (packet data serving node)), a load of a central processing unit (CPU), a memory capacity, etc.

Also, the resources used for selecting at least one PDSN in the PCF of the mobile communication system may be network resources between the PCF and the PDSN, the number of PDSN logical IDs (identifications), the number of available ports, the number of available IPs (internet protocols), etc.

Also, the resources used for selecting at least one PCF/PCP in a BSC (base station controller)/CCP (call control processor) of the mobile communication system may be ATM resources between the BSC and the PCF, an available processing rate of the PCF, a memory capacity, etc.

As described above, the present invention recognizes an amount of the available resources, and allocates one of servers for a requested service according to the amount of the available resources. Accordingly, the present invention prevents a refusal of service to a service requester by a specified server in cases where a specified resource of the server is exhausted but other kinds of resources remain available, to maximize the number of users who may simultaneously use the service with limited resources. Also, the probability that the QoS level required by the user may be guaranteed is increased.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A mobile communication system, comprising:
   n servers having m kinds of resources, where m and n are positive integers numbering two or more;
   a resource management server which receives changed amounts of the kinds of resources from each server at predetermined intervals; and
   a service distributor which receives a service request with a QoS (quality of service) level from a service user, maps the QoS level into amounts of the kinds of resources, and selects a server having a lowest load among the n servers for the service request based on the changed amounts;
   wherein the load is determined as a ratio of the necessary amount to the useable amount of each kind of resources in each server; and
   wherein the service distributor determines a server having a minimum value of a maximum ratio of the necessary amount to the useable amount of each kind of resources.

2. The system of claim 1, wherein in a packet control function (PCF) of the mobile communication system, the kinds of resources used for selecting at least one packet interface processor at a packet control processor (PCP) are at least one of a number of available asynchronous transfer mode (ATM) connections at OS level, a number of available ATM connections at logical level, a number of ATM connections required per call, a processing capacity of an interface between a radio network and a packet data serving node (PDSN), a load of a central processing unit (CPU), and a memory capacity.

3. The system of claim 1, wherein the kinds of resources used for selecting at least one PDSN at the PCF of the mobile communication system are at least one of network resources between the PCF and the PDSN, a number of PDSN logical identifications, a number of available ports, and a number of available IPs (internet protocols).

4. The system of claim 1, wherein the kinds of resources used for selecting at least one PCF/PCP at a base station controller (BSC)/call control processor (CCP) of the mobile communication system are at least one of ATM resources between the BSC and the PCF, an available processing rate of the PCF, and a memory capacity.

5. The system of claim 1, wherein the kinds of resources are quantitatively measurable.

6. The system of claim 1, wherein the servers have a same function.

7. The system of claim 1, wherein the necessary amount of each kind of resources is the resource amount mapped from the QoS level, and the useable amount of each kind of resources is the changed amount of available resources reported by each server.

8. A method of selecting a server in a mobile communication system, said system including n servers having m-kinds of resources, where m and n are positive integers greater than one, a service distributor selecting at least one server for a service request, and a resource management server transferring changed amounts of kinds of available resources received from each server at predetermined intervals to the service distributor, comprising:
   if an i-th service request Ri including a QoS (quality of service) parameter is received by the service distributor, mapping the QoS level onto amounts of the kinds of resources $\{N\_Rsc1, N\_Rsc2, N\_Rsc3, \ldots, N\_Rscm\}$ at the service distributor for $i, j=0, 1, \ldots$, respectively;
   determining a kind of the resource BtnRsc_j having the highest ratio of the necessary amount (N_Rscm) of resources to a useable amount (Rscm_j) of resources in each server and a maximum generation rate of bottleneck of the determined kind of resources with respect to the service request Ri at the service distributor;
   determining a server Sj having a minimum value of the maximum generation rate of bottleneck based on the assumption that said each of the servers $\{S1, S2, S3, \ldots, Sn\}$ is selected for the i-th service request; and
   allocating the determined server Sj for the i-th service request Ri;
   wherein a maximum generation rate of bottleneck BtnRate_j and the kind of resource BtnRsc_j when the j-th server is allocated for the i-th service request Ri are determined by;

$$Btn1(Ri,Sj)=\text{Max}(N\_Rsc1/Rsc1\_j, N\_Rsc2/Rsc2\_j, N\_Rsc3/Rsc3\_j, \ldots, N\_Rscm/Rscm\_j); \text{ and}$$

wherein the server Sj that has a minimum value of the generation rate of bottleneck is determined by;

$$Btn2(Ri)=\text{Min }\{Btn1(Ri,S1), Btn1(Ri,S2), Btn1(Ri,S3), \ldots, Btn1(Ri,Sn)\}.$$

9. The method of claim 8, further comprising:
   after initialization of each of the servers, determining the kinds of resources $\{Rsc1, Rsc2, Rsc3, \ldots, Rscm\}$ quantitatively measurable in said each server S;
   registering the kinds of resources in the service distributor at the resource management server; and
   transferring, to the service distributor, the changed amounts of the kinds of available resources $\{Rsc\_j, Rsc2\_j, Rsc3\_j, \ldots, Rscm\_j\}$ periodically obtained from said each server Sj, where j is a positive integer from 0 to n, with respect to all kinds of resources registered in the service distributor at the resource management server.

10. The method of claim 8, wherein the kinds of resources are quantitatively measurable.

11. The method of claim 8, wherein the servers have a same function.

12. A method of selecting a server in a mobile communication system, including a plurality of servers and a service distributor for selecting at least one of the servers, comprising:
   registering kinds of resources quantitatively measurable of each server;
   receiving changed amounts of the kinds of resources at predetermined intervals from each of the servers;
   receiving a service request with a QoS (quality of service) level from a service user;

mapping the QoS level into amounts of the kinds of resources; and selecting at least one server among the servers for the service request based on the changed amounts and the amounts mapped from the QoS level;

wherein selecting the at least one server comprises:

determining a ratio for each requested resource on each server between a required amount of a respective resource to an available amount of the respective resource for each server;

selecting the ratio that has the maximum ratio for each requested resource for each server; and selecting a server as the least one server which has a minimum value for the selected ratios that have the maximum value.

13. The method of claim 12, wherein if a ratio of the amount mapped from the QoS level to the changed amount for a kind of resources is highest, a server having the minimum value of the maximum ratio is based on the assumption that the each server is selected for the service request is selected.

14. The method of claim 12, wherein the servers have a same function.

15. A mobile communication system, comprising:

a service distributor; and a resource management server;

wherein said service distributor selects a final server among a plurality of servers for a service request based on both a quality of service level from a service user and a measured amount of available resources;

wherein said service distributor determines for each resource on each server a ratio between a required amount of a respective resource and an available amount of the respective resource, selects the ratio that has the maximum value for each server, and then selects the server that has a minimum of the selected ratios that have the maximum value as the final server.

16. The mobile communication system of claim 15, further comprising n servers having m kinds of resources, where m and n are positive integers greater than one.

17. The mobile communication system of claim 16, wherein said n servers are identical.

18. The mobile communication system of claim 15, wherein said service distributor receives said quality of service level from said service user and maps said quality of service level into a quantification of a resource parameter.

19. The mobile communication system of claim 15, wherein said service distributor selects a server having a lowest load.

20. A method for selecting a server in a mobile communication system, comprising:

receiving a service request with a quality of service level from a service user;

measuring an amount of available resources; and selecting a final server among a plurality of servers for said service request based on a function of said quality of service level and said measured amount;

wherein selecting the final server comprises:

determining a bottleneck rate for each requested resource on each server;

selecting, for each server, the requested resource that causes the maximum bottleneck rate such a maximum bottleneck rate resource is selected for each server;

selecting a minimum bottleneck rate from among the maximum bottleneck rate resources; and selecting the final server as the server that includes the minimum bottleneck rate resource among the maximum bottleneck rate resources.

21. The method of claim 20, wherein said function of said quality of service level is said quality of service level mapped into a quantification of a resource parameter.

22. The method of claim 20, wherein said servers are identical.

23. The method of claim 20, wherein said servers have a same function.

24. The method of claim 20, wherein said selecting a server selects a server having a lowest load.

* * * * *